United States Patent
Chang (10) Patent No.: US 10,432,088 B1
(45) Date of Patent: Oct. 1, 2019

(54) TWO-STAGE MULTI-PHASE SWITCHING POWER SUPPLY WITH CROSS-DOMAIN ADAPTIVE VOLTAGE AND FREQUENCY REGULATION

(71) Applicant: DIALOG SEMICONDUCTOR (UK) LIMITED, London (GB)

(72) Inventor: Kevin Yi Cheng Chang, Chandler, AZ (US)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 16/000,715

(22) Filed: Jun. 5, 2018

(51) Int. Cl.
| H02M 3/158 | (2006.01) |
| H02M 3/157 | (2006.01) |
| H02M 1/088 | (2006.01) |
| H02H 7/12  | (2006.01) |
| H02M 1/00  | (2006.01) |

(52) U.S. Cl.
CPC .......... *H02M 3/157* (2013.01); *H02H 7/1213* (2013.01); *H02M 1/088* (2013.01); *H02M 2001/0025* (2013.01); *H02M 2001/0045* (2013.01)

(58) Field of Classification Search
CPC ...... H02M 3/157; H02M 1/44; H03K 3/0315; H03M 1/60; Y02B 70/1466
USPC ....... 323/222, 225, 227, 235, 241, 283, 288, 323/266, 272; 341/50
See application file for complete search history.

(56) References Cited

U.S. PATENT DOCUMENTS

| 7,161,335 | B2* | 1/2007 | Wei | H02M 3/156 323/266 |
| 7,342,528 | B2* | 3/2008 | Ng | H02M 3/157 341/153 |
| 7,489,117 | B2* | 2/2009 | Jain | H02M 3/158 323/224 |
| 7,928,704 | B2* | 4/2011 | Huang | H02M 1/14 323/271 |
| 8,049,496 | B2* | 11/2011 | Chen | G01N 24/08 324/307 |
| 8,710,810 | B1* | 4/2014 | McJimsey | H02M 3/1584 323/272 |
| 2004/0095111 | A1* | 5/2004 | Kernahan | H02M 3/157 323/282 |
| 2004/0095263 | A1* | 5/2004 | Thomas | H02M 3/157 341/53 |
| 2006/0022656 | A1* | 2/2006 | Leung | H02M 3/157 323/283 |
| 2018/0048232 | A1* | 2/2018 | Adell | H02M 3/1563 |

OTHER PUBLICATIONS

Jia Wei and Fred C. Lee, "Two-Stage Voltage Regulator for Laptop Computer CPUs and the Corresponding Advanced Control Schemes to Improve Light-Load Performance," IEEE Applied Power Electronics Conference and Exposition, 2004. APEC '04.

(Continued)

*Primary Examiner* — Rajnikant B Patel
(74) *Attorney, Agent, or Firm* — Haynes and Boone LLP (57) ABSTRACT

A two-stage power converter is disclosed in which a second stage may command a first stage to adjust an output voltage from the first stage to compensate for PVT variations in the second stage. Alternatively, the second stage may adjust a clocking frequency to compensate for the PVT variations.

19 Claims, 8 Drawing Sheets

(56) References Cited

OTHER PUBLICATIONS

J. Sun, M. Xu, Y. Ying, and F. Lee, "High power density, high efficiency system two-stage power architecture for laptop computers," in Power Electronics Specialists Conference, Jun. 18-22, 2006, pp. 1-7.

Robert C.N. Pilawa-Podgurski and David J. Perreault, "Merged Two-Stage Power Converter with Soft Charging Switched-Capacitor Stage in 180 nm CMOS," IEEE Journal of Solid-State Circuits, vol. 47, No. 7, pp. 1557-1567, Jul. 2012.

Julian Yan Zhu and Brad Lehman, "Control loop design for two-stage DC-DC converters with low voltage/high current output," Applied Power Electronics Conference and Exposition, 2003. APEC '03. Eighteenth Annual IEEE.

Pearl Cao, Wai Tung Ng, Olivier Trescases, "Thermal Management for Multi-Phase Current Mode Buck Converters," Applied Power Electronics Conference and Exposition (APEC), 2011 Twenty-Sixth Annual IEEE.

Amr Elshazly, Rajesh Inti, Brian Young, and Pavan Kumar Hanumolu, "Clock Multiplication Techniques Using Digital Multiplying Delay-Locked Loops".

* cited by examiner

TWO-STAGE MULTI-PHASE SWITCHING POWER SUPPLY WITH CROSS-DOMAIN ADAPTIVE VOLTAGE AND FREQUENCY REGULATION

TECHNICAL FIELD

This application relates to switching power converters, and more particularly to a two-stage multi-phase switching power converter with cross-domain adaptive voltage and frequency regulation.

BACKGROUND

A typical computing power supply for laptops and related devices such as tablets uses a combination of Lithium Ion (Li-Ion) batteries, usually arranged in groups of two cells in series that produces a maximum voltage of approximately 10V. Such a relatively high power supply voltage is unsuitable for modern integrated circuits so these devices conventionally include a buck converter to regulate the battery power supply voltage from the series-connected batteries to an internal power supply voltage such as 1V for powering the integrated circuits within the devices.

A single stage multi-phase buck converter would require high voltage components to step down from such a relatively high battery power supply voltage to the relatively low internal power supply voltage. The use of such high voltage components demands substantial die space to achieve suitable drain-to-source resistance and also leads to higher gate drive losses and voltage-current overlap switching losses for the power switches. Thus, single stage multi-phase buck converters are not very efficient in applications in which the output voltage is substantially stepped down from, for example, around 10V to 1V.

To improve the efficiency and increase density, two-stage multi-phase DC/DC power converters have been developed in which a first stage multi-phase buck converter drives a second stage multi-phase buck converter with an intermediate voltage. The second stage multi-phase buck converter regulates the output voltage using the intermediate voltage as an input power supply. The second stage may use high-speed core transistors since the intermediate voltage is reduced as compared to the relatively-high battery voltage. Although such two stage voltage regulators have desirable efficiency and density in theory, their conventional implementation suffers from a number of problems. For example, variations in process, voltage, and temperature (PVT) variations across the various converter phases in the second stage reduces efficiency and also speeds up device aging cycles so as to lower reliability. Moreover, PVT variations may result in excessive propagation delay, slower circuit response, and higher on-resistance of the transistors. These effects of PVT variations lower controller stability, available maximum operating frequency, and converter efficiency.

Accordingly, there is a need in the art for improved two-stage multi-phase switching power converter with PVT compensation.

SUMMARY

Two main embodiments for PVT compensation of a two stage switching power converter are disclosed. In a first main embodiment, a PVT compensation circuit in the second stage monitors a control voltage for a PLL having a clock signal that controls the timing of the switching periods for the second stage. Should the control voltage be too high or too low due to a PVT variation, the PVT compensation circuit forces the first stage to adjust an output voltage that functions as the input voltage for the switching stages in the second stage so as to compensate for the PVT variation. The first main embodiment is thus referred to herein a "cross domain adaptive voltage" embodiment since it involves both stages and adjusts the output voltage of the first stage.

In a second main embodiment, a PVT compensation circuit in the second stage monitors a control voltage from a control loop for a PLL having a clock signal that controls the timing of the switching periods for the second stage. Should the control voltage be too high or too low due to a PVT variation, the PVT compensation circuit offsets the control voltage to form an offset control voltage. The PLL responds to the offset control voltage by offsetting its clocking frequency from a default value so as to compensate for the PVT variation. The second main embodiment is thus referred to herein an "adaptive frequency" embodiment since it involves the adjustment of the clocking frequency that controls the timing of the switching periods for the second stage.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To account for PVT variations, a two-stage switching power converter is disclosed in which a first-stage multi-phase buck converter regulates an intermediate voltage that functions as an input voltage to a second-stage multi-phase buck converter regulating an output voltage. The first-stage multi-phase buck converter will be referred to herein as the "first stage" for brevity. Similarly, the second-stage multi-phase buck converter will be referred to herein as the "second stage." The second stage includes a phase-locked loop (PLL) that generates a clock signal for controlling the pulse-width modulation of the switching in the various (active) phases in the second stage. Within the PLL, a control loop adjusts a control voltage for a voltage-controlled oscillator (VCO) that produces the clock signal. The PLL is powered by a power supply voltage VDD produced by the first stage. The power supply voltage VDD (which will be referred to herein as VDD for brevity) is also the input voltage for the switching stages in the various phases in the second stage. To effect the desired PVT compensation, a PVT compensation circuit in the second stage generates a digital command that compensates for the PVT variations in the second stage according to two main embodiments.

In a first one of the two main embodiments, the first stage includes a voltage digital-to-analog converter (VDAC) that converts the digital command into a reference voltage for an error amplifier that generates an error voltage responsive to a difference between the reference voltage and VDD. Each phase in the first stage includes a pulse-width modulator that controls the pulse width modulation (PWM) of the phase's power switching responsive to the error voltage. If the reference voltage were constant, VDD would thus be constant. But since the PVT compensation circuit is indirectly controlling the reference voltage through the digital command, the first stage will either increase or decrease VDD from a default value so that the PVT variations in the second stage are compensated. Since the PVT compensation involves both stages, the first embodiment is denoted herein as a "cross domain adaptive voltage" embodiment that controls the input voltage VDD for the second stage. As compared to the second stage, the first stage operates at a lower switching frequency and larger step-down voltage ratio. It is the second stage that is thus more sensitive to PVT variations due to its faster switching frequency and larger load current. In the following discussion, there is thus no PVT compensation for the first stage. However, it will be appreciated that PVT compensation may be performed in the first stage in alternative embodiments.

In the second main embodiment, the PVT compensation circuit does not adjust the reference voltage for the first stage. The first stage thus includes a reference voltage source such as a bandgap reference that generates a constant reference voltage such that VDD is constant in the second main embodiment. To effect the PVT compensation, the PVT compensation circuit still generates a digital command responsive to the control voltage in the PLL. But the digital command is converted into a control voltage offset that is added to the control voltage to form an offset control voltage. The control loop in the PLL still functions to control the control voltage but the VCO is now responsive to the offset control voltage such that it is the frequency of the clock signal that is adjusted to effect the PVT compensation. In particular, the period of the switching for the pulse width modulation of the switching of the power switches in the second stage phases will either be increased or decreased from a default value responsive to the change in the clock frequency. The second main embodiment is thus denoted herein as the adaptive frequency embodiment. In both the cross domain adaptive voltage and the adaptive frequency embodiments, the PVT compensation circuit uses the control voltage to determine whether PVT compensation should be performed. In particular, the PVT compensation circuit determines whether the control voltage is within a range bounded by a lower threshold voltage and an upper threshold voltage. If the control voltage is below the lower threshold voltage or above the upper threshold voltage due to a PVT variation, the PVT compensation circuit either increments or decrements the digital command to force the control voltage to be within the desired range. The cross domain adaptive voltage embodiment will be discussed first followed by a discussion of the adaptive frequency embodiment.

Figure 1A:
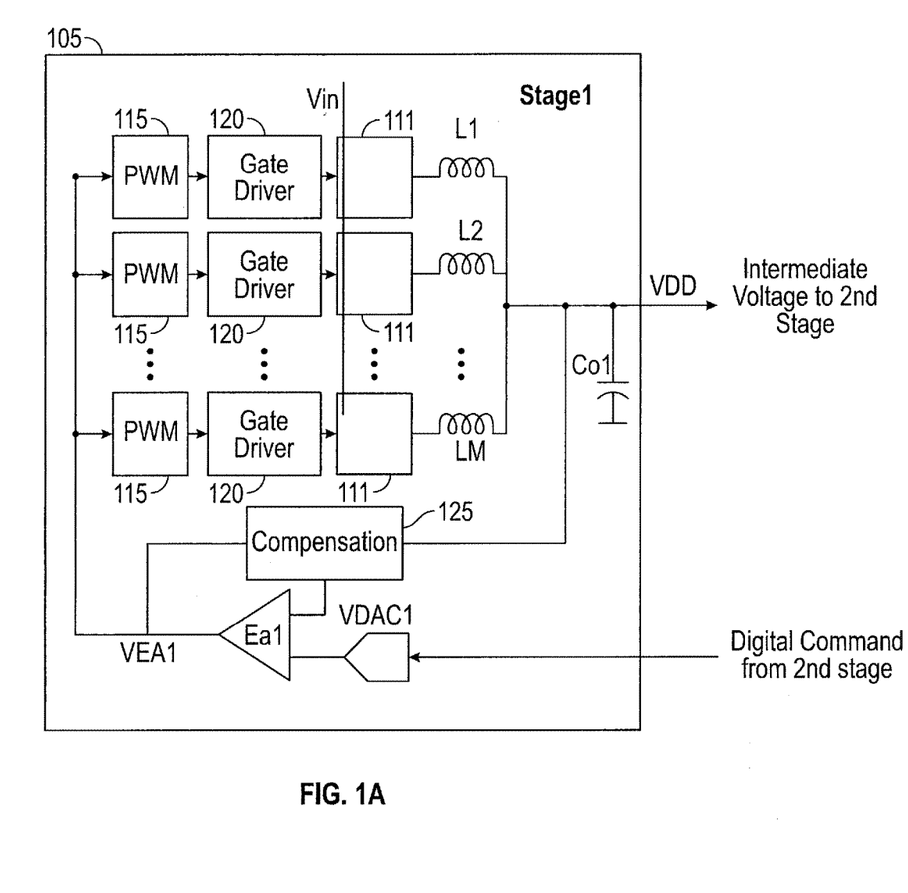
FIG. 1A is a diagram of a first stage switching converter in a cross domain adaptive voltage embodiment of a two stage switching power converter with PVT compensation in accordance with an aspect of the disclosure.
Figure 1B:
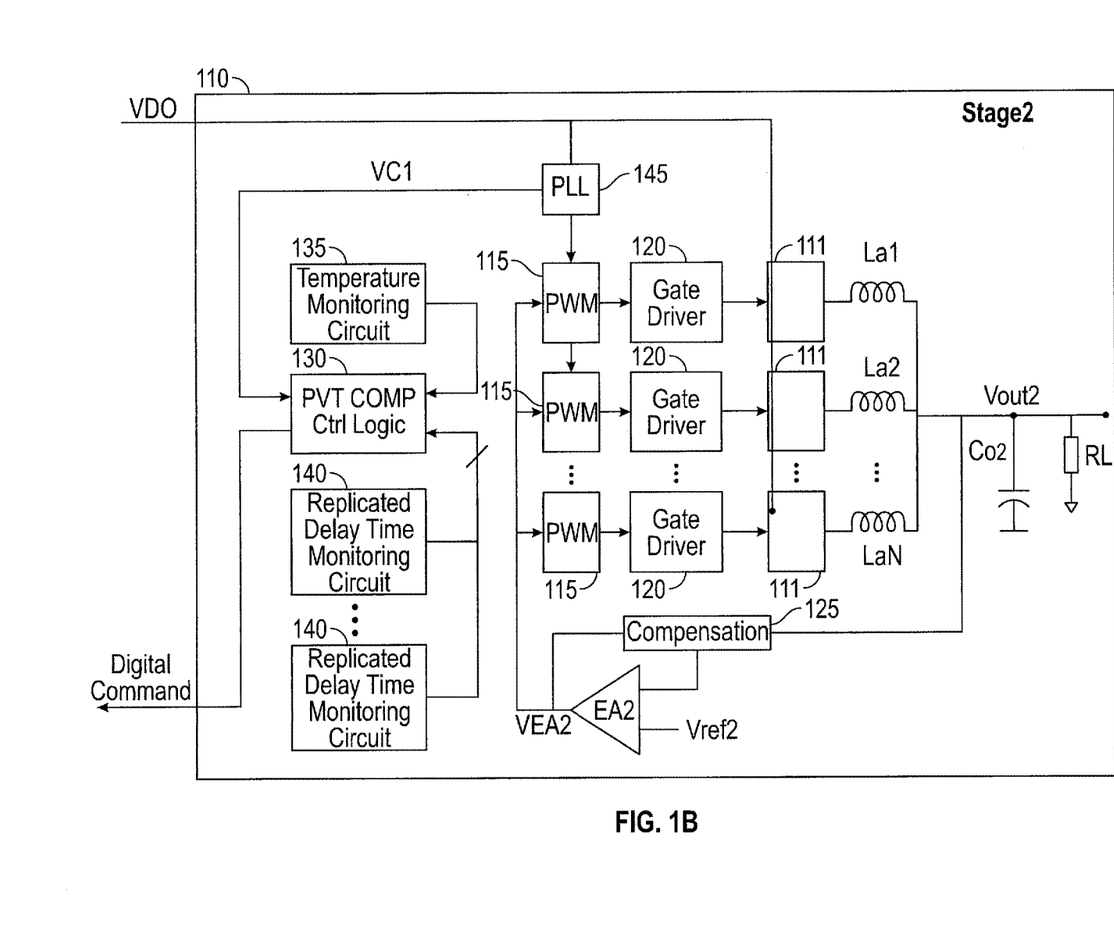
FIG. 1B is a diagram of a second stage switching converter in a cross domain adaptive voltage embodiment of a two stage switching power converter with PVT compensation in accordance with an aspect of the disclosure.

An example two-stage switching power converter with cross domain adaptive voltage control is shown in FIG. 1A and FIG. 1B. In particular, a first-stage multi-phase buck converter 105 is shown in FIG. 1A whereas a second-stage multi-phase buck converter 110 is shown in FIG. 1B. Referring now to FIG. 1A, first stage 105 includes a plurality of M phases corresponding to M inductors ranging from a first inductor L1 to an Mth inductor LM. Each phase includes a switching stage 111 having its own high-side switch and a low-side switch (the switches are not shown for illustration clarity). When a phase's high-side switch Si closes, an input voltage Vin causes a magnetizing current to flow through the phase's inductor as is known in the buck converter arts. As is also known in the buck converter arts, each phase has its own pulse-width modulator (PWM) 115 and gate driver 120. The (active) phases all drive an intermediate voltage VDD filtered by a first-stage output capacitor Co1. The voltage VDD functions as the input voltage to the switching stages in second-stage multi-phase buck converter 105 as will be explained further herein.

First stage 105 includes a first stage voltage digital-to-analog converter VDAC1 that converts the digital command discussed earlier from second stage 110 into a reference voltage. A first stage error amplifier EA1 that is compensated by a compensation network 125 compares the reference voltage to VDD to generate a first stage error voltage VEA1 that is used by the pulse-width modulators 115 in the active phases to control the pulse widths for the switching in these active phases. As compared to second stage 110, first stage 105 operates at a lower switching frequency and larger step-down voltage ratio. It is the second stage that is thus more sensitive to PVT variations due to its faster switching frequency and larger load current. In one cross domain embodiment, there is thus no PVT compensation for first stage 105. However, it will be appreciated that PVT compensation may be performed in first stage 105 in alternative cross domain embodiments.

Second stage 110 includes a plurality of N phases. The number N is independent of the number M for the phases in the first stage. Thus, N may be larger than, smaller than, or equal to M. Each phase has the same basic components as discussed with regard to first stage 105 such that each phase in second stage 110 includes an inductor, ranging from a first inductor La1 for a first phase to an Nth inductor LaN for an Nth phase. The inductors are all tied to an output terminal for an output voltage (Vout2) as supported by an output capacitor Co2. The load driven by the output voltage is represented by a resistance RL. Each phase also includes a gate driver 120 that controls the switching of a switching stage 111. However, switching stages 111 in second-stage multi-phase buck converter 110 drive a magnetizing current into their phase's inductor responsive to VDD whereas switching stages 111 in first-phase multi-phase buck converter do so with regard to the input voltage Vin. A second stage error amplifier EA2 compares a second stage reference voltage Vref2 to the output voltage Vout2 to generate a second stage error voltage VEA2. As discussed with regard to first stage error amplifier EA1, second stage error amplifier EA2 includes a compensation network 125.

A PLL 145 provides a clock signal (CLK) to various components in second stage 110 including pulse-width modulators 115. The switching period for switching stages 111 is thus established by the clock signal frequency. PLL 145 includes a control loop to keep the clock signal frequency equal to a desired reference or default level by regulating a control voltage VC1 that drives a voltage-controlled oscillator (discussed further below) within PLL 145. Depending upon the process, voltage, and temperature corner for second stage 110, the control voltage will vary even though the clock frequency remains at the desired default level. PVT compensation circuit 130 compensates for the PVT variations by determining whether the control voltage lies within a normal operating range bounded by a lower threshold voltage and an upper threshold voltage. Should PVT compensation circuit 130 determine that the control voltage lies with the normal operating range, no adjustment of the digital command occurs such that first stage 105 would not adjust VDD. But if the control voltage is greater than the upper threshold voltage or lower than the lower threshold voltage, PVT compensation circuit 130 either increments or decrements the digital command. In response to the change in the digital command, VDD is either raised or lowered as appropriate so that the control loop within PLL 145 adjusts the control voltage into the normal operating range. In this fashion, PVT variations in second stage 110 that could affect the regulation of the output voltage are compensated. The increment (or decrement) of the digital command depends upon the VCO design in PLL 145. For example, if the VCO is a ring oscillator, increasing VDD increases the PLL frequency and thus increases the control voltage. But in alternative embodiments, the VCO may be designed such that an increase in VDD decreases the PLL frequency. It will thus be understood that the incrementing and decrementing of the digital command by PVT compensation circuit 130 depends upon the VCO behavior with regard to an increase or decrease in VDD.

The temperature of the inductor in each phase for second-stage multi-phase buck converter 110 may be monitored by a temperature monitoring circuit 135. For example, temperature monitoring circuit 135 may derive an average operating temperature for second-stage multi-phase buck converter 110 based upon these individual inductor temperature measurements. Should the average temperature exceed a temperature threshold, PVT compensation circuit 130 transmits a power down signal (such as through an all-zero value for the digital command) to the VDAC in the first-stage multi-phase buck converter 105 to power down VDD and thus force a shutdown of the second stage operation. As will be explained further herein, such an over-temperature condition can also trigger a shutdown of a linear dropout regulator (LDO) that regulates an internal power supply voltage for powering components such as the pulse-width modulators 115 and gate drivers 120 in second-stage multi-phase buck converter 110.

The PVT compensation of VDD could cause control loops in second-stage multi-phase buck converter to either run too slow or too fast. In particular, the various control loops have critical path timing requirements as known in the buck converter arts. Each of the critical paths in second-stage multi-phase buck converter 110 may be monitored by a corresponding delay time replica monitoring circuit. For example, if second-stage multi-phase buck converter 110 includes a plurality of M such critical paths, second-stage multi-phase buck converter 110 may include a plurality of M delay time replica monitoring circuits 140, ranging from a first such monitor to a final Mth monitor. Each delay time replica monitoring circuit 140 replicates the delay time on the corresponding critical path in second-stage multi-phase buck converter 110. In addition, each delay time replica monitoring circuit 140 monitors the effects of VDD on its particular replicated critical path delay with regard to the replicated critical path delay being too slow (below a slow time threshold) or too fast (above a fast time threshold). Should a delay time monitoring circuit 140 detect that its replicated critical path delay violates these timing thresholds, it commands PVT compensation circuit 130 from further incrementing or decrementing of the digital command. In this fashion, the PVT compensation for second stage 110 is prevented from violating timing requirements.

Figure 2:
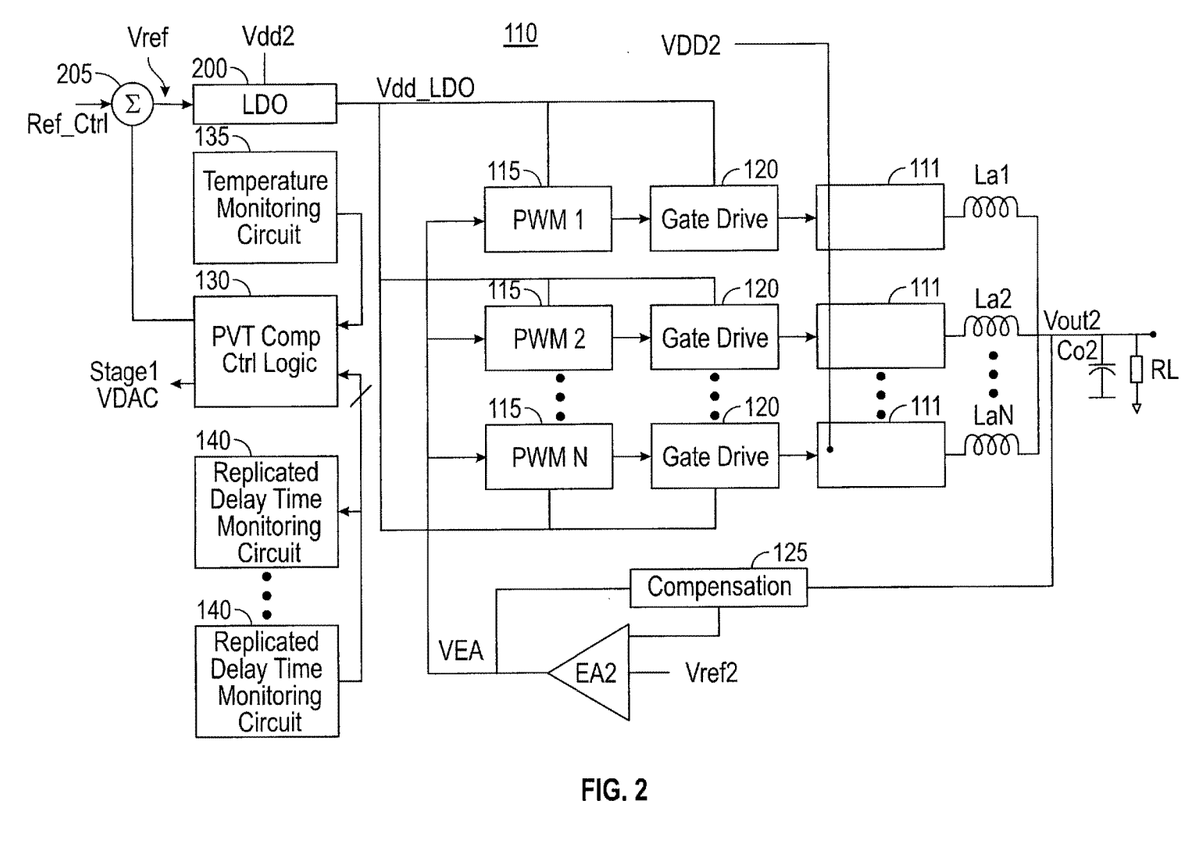
FIG. 2 is a diagram of a second stage switching converter in a cross domain adaptive voltage embodiment of a two stage switching power converter with PVT compensation in which an LDO internal power supply is also compensated in accordance with an aspect of the disclosure.

Second stage 110 includes a regulator such as a linear dropout regulator (LDO) that regulates an internal power supply voltage using the VDD as an input voltage. In this fashion, the internal power supply voltage is isolated from any noise on VDD. Second stage 110 may thus be configured to compensate the internal power supply voltage as shown in FIG. 2. PLL 145 is not shown in FIG. 2 for illustration clarity but it would be arranged as discussed with regard to FIG. 1 so that PVT compensation circuit 130 may monitor its control voltage with regard to the normal operating range. Pulse-width modulators 115, gate drivers 120, switching stages 111, error amplifier EA2, compensation network 125, output capacitor C02, and the inductors La1 through LaN are arranged as discussed with regard to FIG. 1B. Similarly, temperature monitoring circuit 135 and delay time replica monitoring circuits 140 function as discussed with regard to FIG. 1B. An LDO 200 regulates an internal power supply voltage Vdd_LDO using VDD as an input voltage. VDD_LDO functions as the supply voltage for various analog and digital components such as pulse-width modulators 115 and gate drivers 120. As will be explained further herein, PVT compensation circuit 130 not only generates the digital command to first stage 105 in response to monitoring the control voltage but also generates an offset for the reference voltage (Vref) that LDO 200 uses to compare to VDD_LDO in terms of regulating VDD_LDO to the desired value. The offset is added with the default reference voltage (Ref_ctrl) in an adder 205 to generate the offset reference voltage. In this fashion, VDD_LDO will also be adjusted higher or lower if necessary to account for PVT variations in second stage 110.

Figure 3:
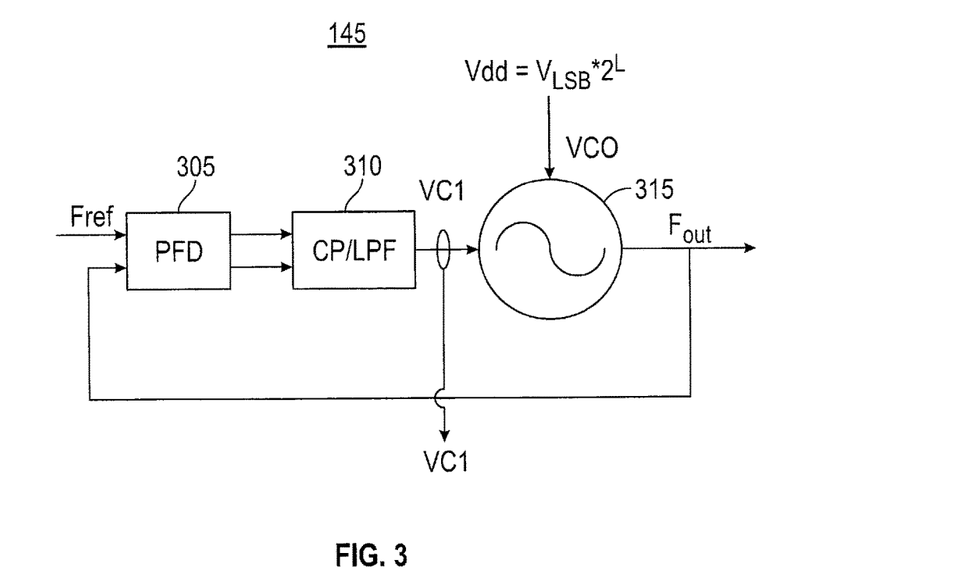
FIG. 3 is a diagram of the PLL in the second stages of FIGS. 1B and 2 in accordance with an aspect of the disclosure.

PLL 145 is shown in more detail in FIG. 3. A phase detector 305 determines whether the PLL output clock is leading or lagging a reference clock having a reference frequency Fref. Should the PLL output clock be leading, phase detector 305 asserts an UP signal whereas it asserts a down (DN) signal if the PLL output clock is lagging. A charge pump in a charge pump/loop filter (CP/LPF) 310 either charges or discharges with regard to the UP and DN signals to provide a charge pump output voltage that is filtered by the loop filter to produce the control voltage VC1. This control voltage controls the oscillation frequency of a VCO 315 that produces the PLL output clock. VDD from first stage 105 functions as the supply voltage for VCO 315. The frequency (Fout) for the output clock signal will thus depend not only on the control voltage but also on VDD. In particular, Fout may be approximated using the following equation (1):

$$F_{out} \approx K_{VCO1} * VC1 + K_{VCO2} * VDD \qquad \text{Eq. (1)}$$

where $K_{VCO1}$ is the control voltage frequency gain for VCO 315 and $K_{VCO2}$ is the frequency gain for VCO 315 with respect to its supply voltage VDD. If the digital command driving the first stage VDAC1 is an L-bit wide digital command having a value X (0≤X≤L), VDD may be deemed to equal $V_{LSB\_VDAC1} * 2^X$, where $V_{LSB\_VDAC1}$ is the value for VDD in response to the least significant bit of the digital command. Equation (1) may thus be rewritten as the following equation (2):

$$F_{out} \approx F0 + \Delta F_{LSB} * 2^X \qquad \text{Eq. (2)}$$

where F0 equals KVCO1*VC1 and $\Delta F_{LSB}$ equals $K_{VCO2} * V_{LSB\_VDAC1}$.

Figure 4:
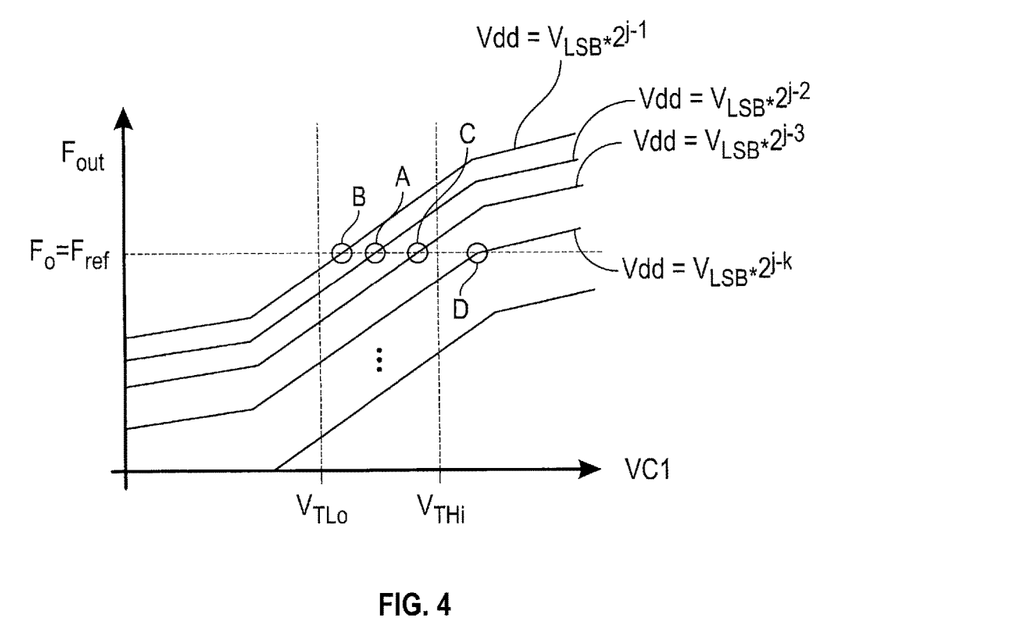
FIG. 4 illustrates the PLL clock frequency curves as a function of the control voltage for a plurality of power supply voltage values for the PLL of FIG. 3.

The resulting clock frequency as a function of the control voltage for various values of the digital command (and thus various values of VDD) are shown in FIG. 4. In particular, the frequency plots for increments of the digital command ranging from $V_{LSB\_VDAC1} * 2^{j-1}$ to $V_{LSB\_VDAC1} * 2^{j-k}$ are illustrated in FIG. 4. A PVT corner in which the digital command equals $V_{LSB\_VDAC1} * 2^{j-1}$ results in a control voltage value B that is within the normal operating range defined by a lower threshold voltage $V_{TLo}$ and an upper threshold voltage $V_{THi}$. Similarly, another PVT corner in which the digital command equals $V_{LSB\_VDAC1} * 2^{j-2}$ results in a control voltage value A that is also within the normal operating range. Yet another PVT corner results in a control voltage C within the normal operating range with the digital command equaling $V_{LSB\_VDAC1} * 2^{j-3}$. Should the control voltage correspond to points A, B, or C, PVT compensation circuit 130 does not toggle (increment or decrement) the digital command to the first stage VDAC1 since these points are all within the normal operating range. But a control voltage at point D is greater than the upper threshold voltage. PVT compensation circuit 130 would thus toggle the digital command to adjust VDD so that the control voltage is in turn adjusted back into the normal operating range.

Figure 5:
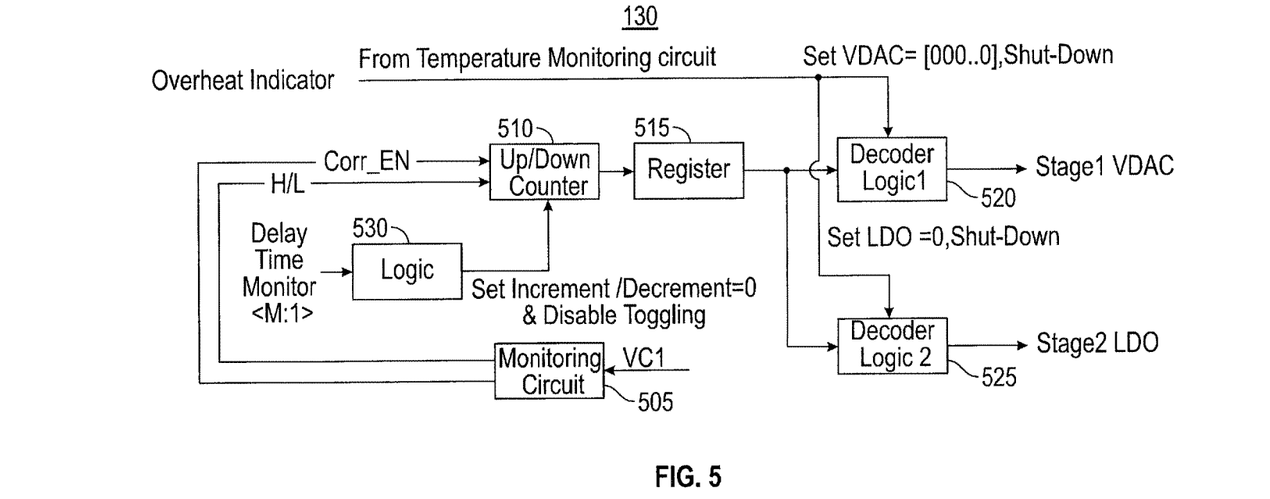
FIG. 5 is a diagram of a PVT compensation circuit in accordance with an aspect of the disclosure.

PVT compensation circuit 130 is shown in more detail in FIG. 5. A monitoring circuit 505 compares the control voltage VC1 to the lower and upper threshold voltages to determine whether the control voltage is greater than the upper threshold voltage or lower than the lower threshold voltage. Should the control voltage be greater than the upper threshold voltage, monitoring circuit 505 asserts a correction enable signal (Corr_EN) and adjusts a high/low (H/L) flag signal to indicate the high control voltage condition. Conversely, monitoring circuit 505 asserts the correction enable signal and adjusts the H/L flag signal to indicate a low control voltage condition if the control voltage is lower than the lower threshold voltage. A up/down counter 510 adjusts a count up or down as necessary in response to the high or low control voltage conditions. A register 515 then registers the resulting count so that it may be decoded in a decoder 520 to set the digital command for the first stage VDAC1. Similarly, a decoder 525 decodes the count to determine the offset for the LDO reference voltage.

Should there be an overheat condition detected by temperature monitoring circuit 135 (FIGS. 1B and 2), decoder 520 responds by setting the digital command to all zeroes. First stage 105 is configured to respond to the all-zero digital command by ceasing operation. Similarly, decoder 525 responds to the overheat condition by shutting down LDO 200 (FIG. 2). A logic circuit 530 responds to any timing violations detected by delay time replica monitoring circuits 140 (FIGS. 1A and 2) by preventing up/down counter 510 from toggling so that the digital command and the LDO voltage are disabled from additional changes.

Figure 6:
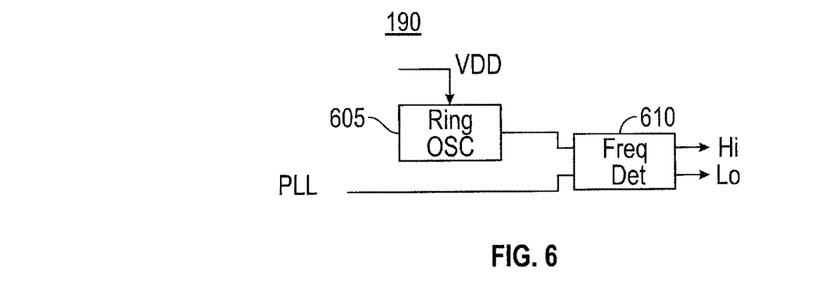
FIG. 6 is a diagram of a delay time replica circuit in accordance with an aspect of the disclosure.

Each delay time replica monitoring circuit 140 may be implemented as shown in FIG. 6. A ring oscillator 605 includes a sufficient number of delay units (inverters) powered by VDD so that the delay through this number of inverters equals the critical path delay being modeled when VDD equals its default value. As VDD is adjusted from this value due to the PVT compensation, the resulting ring oscillator frequency (and thus the delay through the inverters) will vary from the critical path delay. A frequency detector 610 compares the ring oscillator frequency to the PLL clock frequency to determine whether the ring oscillator frequency is too high (corresponding to the modeled delay being too short) or is too low (corresponding to the modeled delay being too long). Frequency detector 610 asserts a high (Hi) signal if the ring oscillator frequency is too high. Similarly, frequency detector 610 asserts a low (Lo) signal if the ring oscillator frequency is too low. Referring again to FIG. 5, logic circuit 530 monitors the various high and low signals from all of delay time replica monitoring circuits 140 to determine whether the adjustment of VDD and the LDO power supply voltage should be stopped. In this fashion, the adjustment of these voltages to compensate for PVT variations does not cause second stage 110 to violate critical path timing requirements.

Figure 7A:
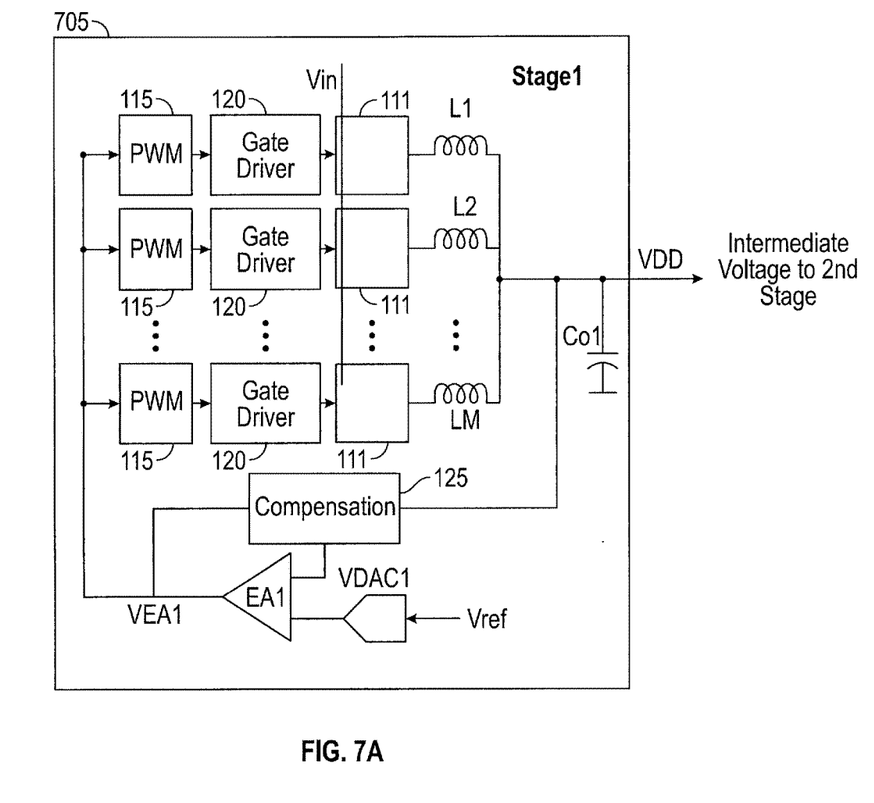
FIG. 7A is a diagram of a first stage switching converter in an adaptive frequency embodiment of a two stage switching power converter with PVT compensation in accordance with an aspect of the disclosure.
Figure 7B:
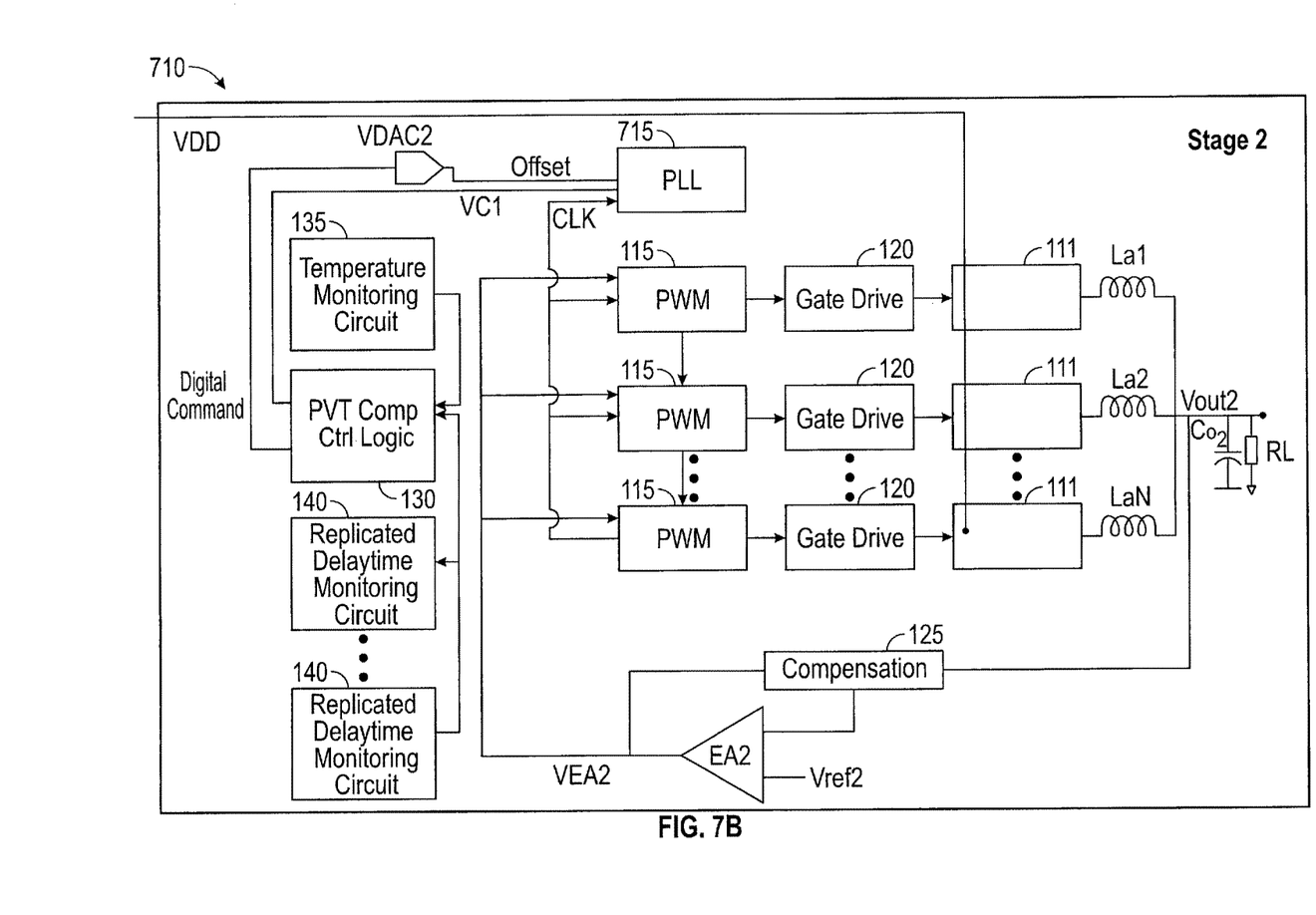
FIG. 7B is a diagram of a second stage switching converter in an adaptive frequency embodiment of a two stage switching power converter with PVT compensation in accordance with an aspect of the disclosure.

An adaptive frequency embodiment for a two-stage switching power converter will now be discussed with regard to FIG. 7A and FIG. 7B. In particular, a first-stage multi-phase buck converter 705 is shown in FIG. 7A for such a two-stage converter whereas a corresponding second-stage multi-phase buck converter 710 is shown in FIG. 7B. In first stage 705, the various phases and associated circuitry are arranged as discussed with regard to FIG. 1A except that the reference voltage Vref for first stage VDAC1 is constant. For example, a bandgap reference (not illustrated) may generate Vref for first stage 705. The power supply VDD regulated by first stage 105 will thus not change with regard to PVT variations in second stage 710.

To compensate for the PVT variations, PVT compensation circuit 130 in second stage 710 adjusts the PLL clock frequency for a PLL 715. The digital command from PVT compensation circuit 130 that is toggled in response to changes in the control voltage VC1 is converted into a control voltage offset by a second stage VDAC (VDAC2). A clock signal produced by PLL 715 will thus have an frequency that is adjusted either higher or lower from a default value to compensate for the PVT variations analogously to the adjustment of VDD in the cross-domain embodiment. The remaining components in second stage 710 are as discussed with regard to second stage 110. The switching period for switching stages 111 will thus be adjusted either higher or lower from a default switching period in response to the changes in the PLL clock frequency.

Figure 8:
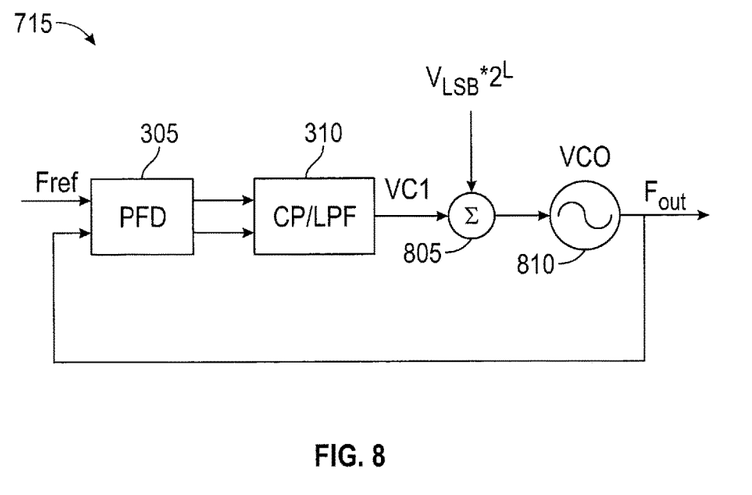
FIG. 8 is a diagram of the PLL in the second stage switching converter of FIG. 7 in accordance with an aspect of the disclosure.

PLL 715 is shown in more detail in FIG. 8. Phase detector 305 and charge pump/loop filter 310 function as discussed with regard to PLL 145 to adjust the control voltage VC1. But VC1 is added with the offset from VDAC2 in an adder 805 to produce an offset control voltage VC that controls the oscillation frequency of a VCO 810. The control loop established by phase detector 305 and charge pump/loop filter 310 functions to regulate the output frequency Fout for the output clock from VCO 810 to equal the default value Fref. But the offset from the analog conversion of the digital command that is added to the control voltage VC1 to form the offset control voltage VC1 forces the output frequency higher or lower from the default value Fref as the digital command is toggled as discussed analogously with regard to FIG. 5. Should the control voltage VC1 lie within the normal operating range, PVT compensation circuit 130 does not toggle the digital command such that the output frequency Fref is not adjusted. But should a PVT variation cause the control voltage VC1 to be too high or too low, PVT compensation circuit 130 toggles the digital command so that the output frequency is adjusted. The control loop in PLL 715 then changes VC1 so that it is brought within the normal operating range. The toggling of the digital command may be ceased in response to timing violations as discussed with regard to FIG. 5. Similarly, first stage 105 may be shut down in response to an overheat condition. The LDO voltage in second stage 710 may also be adjusted to compensate for PVT variations as discussed with regard to second stage 110.

Those of some skill in this art will by now appreciate that many modifications, substitutions and variations can be made in and to the materials, apparatus, configurations and methods of use of the devices of the present disclosure without departing from the scope thereof. For example, a digital PLL may instead be used in the cross-domain and adaptive frequency embodiments discussed above. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A two-stage converter, comprising:
   a first-stage multi-phase buck converter including:
      a digital-to-analog converter configured to convert a digital command into a reference voltage; and
      an error amplifier configured to generate an error voltage responsive to a difference between an output voltage for the first-stage multi-phase buck converter, wherein each phase in the first-stage multi-phase buck converter includes a pulse-width modulator configured to modulate a switching of a switching stage for the phase responsive to the error voltage; and
   a second-stage multi-phase buck converter wherein each phase in the second-stage multi-phase buck converter includes a switching stage powered by the output voltage for the first-stage multi-phase buck converter, the second-stage multi-phase buck converter further including:
      a phase-locked loop (PLL) having a control voltage for controlling a frequency of an output clock signal from the PLL; and
      a process, voltage, and temperature (PVT) compensation circuit configured to adjust the digital command responsive to the control voltage to compensate for PVT variations in the second-stage multi-phase buck converter.

2. The two-stage converter of claim 1, wherein each phase in the second-stage multi-phase buck converter includes a pulse-width modulator configured to modulate a switching of a switching stage for the phase according to a switching period defined by the output clock signal.

3. The two-stage converter of claim 2, wherein the PVT compensation circuit is further configured to adjust the digital command responsive to the control voltage being outside of an operating range.

4. The two-stage converter of claim 2, wherein the second-stage multi-phase buck converter further includes a temperature monitoring circuit configured to determine whether an overheat condition exists for the second-stage multi-phase buck converter, and wherein the PVT compensation circuit is further configured to command the first-stage multi-phase buck converter to shut down in response to a detection of the overheat condition by the temperature monitoring circuit.

5. The two-stage converter of claim 2, wherein the second-stage multi-phase buck converter further includes a delay time replica circuit configured to replicate a delay for a critical path in the second-stage multi-phase buck converter with a replicated delay, and wherein the PVT compensation circuit is further configured to stop the adjustment of the digital command responsive to the replicated delay being outside of a delay range.

6. The two-stage converter of claim 3, wherein the second-stage multi-phase buck converter further includes:
   a linear dropout regulator (LDO) for regulating an internal power supply voltage for the second-stage multi-phase buck converter responsive to an LDO reference voltage; wherein the PVT compensation circuit is further configured to adjust the LDO reference voltage responsive to the control voltage being outside of the operating range.

7. The two-stage converter of claim 6, wherein the operating range is bounded by a lower threshold voltage and an upper threshold voltage.

8. The two-stage converter of claim 1, wherein the PVT compensation circuit is further configured to adjust the digital command by one-bit increments and decrements.

9. A method of operation for two-stage power converter, comprising:
   in a first-stage multi-phase buck converter for the two-stage power converter:
      converting a digital command into a reference voltage;
      comparing the reference voltage to an output voltage for the first-stage multi-phase buck converter to generate an error voltage; and
      regulating the output voltage responsive to the error voltage;
   in a second-stage multi-phase buck converter for the two-stage power converter:
      powering a switching stage in each active phase of the second-stage multi-phase buck converter with the output voltage;
      generating a clock signal responsive to a control voltage to control a switching period for the second-stage multi-phase buck converter; and
      adjusting the digital command responsive to the control voltage to compensate for a process, voltage, and temperature (PVT) variation in the second-stage multi-phase buck converter.

10. The method of claim 9, wherein a switching frequency for the second-stage multi-phase buck converter is greater than a switching frequency for the first-stage multi-phase buck converter.

11. The method of claim 9, further comprising:
    detecting whether an overheat condition exists for the second-stage multi-phase buck converter; and
    adjusting the digital command to force the first-stage multi-phase buck converter to shut down responsive to a detection of the overheat condition.

12. The method of claim 9, further comprising:
    modeling a critical path delay for the second-stage multi-phase buck converter to form a replicated critical path delay; and
    stopping the adjustment of the digital command responsive to the replicated critical path delay being outside of an operating range.

13. The method of claim 9, wherein adjusting the digital command comprises decoding a count.

14. The method of claim 9, wherein adjusting the digital command comprises incrementing or decrementing the digital command in one-bit steps.

15. A two-stage converter, comprising:
a second-stage multi-phase buck converter wherein each phase in the second-stage multi-phase buck converter includes a switching stage powered by an output voltage from a first-stage multi-phase buck converter for the two-stage converter, the second-stage multi-phase buck converter further including:
a phase-locked loop (PLL) having a control voltage that is adjustable by an offset to adjust a frequency for a clock signal from the PLL; and
a process, voltage, and temperature (PVT) compensation circuit configured to adjust the offset responsive to the control voltage to compensate for PVT variations in the second-stage multi-phase buck converter.

16. The two-stage converter of claim 15, wherein each phase in the second-stage multi-phase buck converter includes a pulse-width modulator configured to modulate a switching of a switching stage for the phase according to a switching period defined by the frequency of the clock signal.

17. The two-stage converter of claim 16, wherein the PVT compensation circuit is further configured to adjust the offset responsive to the control voltage being outside of an operating range.

18. The two-stage converter of claim 16, wherein the second-stage multi-phase buck converter further includes a temperature monitoring circuit configured to determine whether an overheat condition exists for the second-stage multi-phase buck converter, and wherein the PVT compensation circuit is further configured to command the first-stage multi-phase buck converter to shut down in response to a detection of the overheat condition by the temperature monitoring circuit.

19. The two-stage converter of claim 15, wherein the operating range is bounded by a lower threshold voltage and an upper threshold voltage.

* * * * *

UNITED STATES PATENT AND TRADEMARK OFFICE
CERTIFICATE OF CORRECTION

PATENT NO. : 10,432,088 B1
APPLICATION NO. : 16/000715
DATED : October 1, 2019
INVENTOR(S) : Kevin Yi Cheng Chang Page 1 of 1

It is certified that error appears in the above-identified patent and that said Letters Patent is hereby corrected as shown below:

In the Specification

In the Detailed Description:
In Column 4, Line 23, change "Si" to --S1--
In Column 4, Line 30, change "Col" to --Co1--

Signed and Sealed this
Twenty-fourth Day of March, 2020

Andrei Iancu
*Director of the United States Patent and Trademark Office*